(12) United States Patent
Dec

(10) Patent No.: US 7,090,606 B2
(45) Date of Patent: Aug. 15, 2006

(54) ADJUSTABLE TENSIONER

(75) Inventor: Andrzej Dec, Rochester Hills, MI (US)

(73) Assignee: The Gates Corporation, Denver, CO (US)

( * ) Notice: Subject to any disclaimer, the term of this patent is extended or adjusted under 35 U.S.C. 154(b) by 361 days.

(21) Appl. No.: 10/613,881

(22) Filed: Jul. 3, 2003

(65) Prior Publication Data

US 2005/0003915 A1     Jan. 6, 2005

(51) Int. Cl.
*F16H 7/12*     (2006.01)

(52) U.S. Cl. .................. 474/135; 474/117; 474/133

(58) Field of Classification Search ........ 474/133–136, 474/112, 117, 109–110, 138
See application file for complete search history.

(56) References Cited

U.S. PATENT DOCUMENTS

| | | | | |
|---|---|---|---|---|
| 3,975,965 A | * | 8/1976 | Speer .......................... | 474/135 |
| 4,362,062 A | * | 12/1982 | Peterson ................ | 73/862.453 |
| 4,392,840 A | * | 7/1983 | Radocaj ...................... | 474/117 |
| 4,500,303 A | * | 2/1985 | Sermersheim et al. ...... | 474/112 |
| 4,504,254 A | * | 3/1985 | Foster ........................ | 474/133 |
| 4,557,709 A | * | 12/1985 | St. John ..................... | 474/117 |
| 4,767,383 A | * | 8/1988 | St. John ..................... | 474/133 |
| 4,886,483 A | * | 12/1989 | Henderson .................. | 474/135 |
| 4,957,471 A | * | 9/1990 | St. John ..................... | 474/133 |
| 5,045,031 A | * | 9/1991 | Thomey ..................... | 474/138 |
| 5,098,347 A | | 3/1992 | Sajczvk et al. ............. | 474/135 |
| 5,342,249 A | * | 8/1994 | Gardner et al. ............. | 474/135 |
| 5,423,723 A | * | 6/1995 | Gardner et al. ............. | 474/135 |
| 5,575,727 A | * | 11/1996 | Gardner et al. ............. | 474/135 |
| 5,591,094 A | | 1/1997 | Farmer et al. .............. | 474/117 |
| 5,938,552 A | | 8/1999 | Serkh ......................... | 474/135 |
| 6,165,091 A | * | 12/2000 | Dinca et al. ................ | 474/112 |

FOREIGN PATENT DOCUMENTS

DE         3843373 A1 *  6/1990  ................ 112/254

* cited by examiner

*Primary Examiner*—Marcus Charles
(74) *Attorney, Agent, or Firm*—J. G. Thurnau, Esq.; C. H. Castleman, Esq.; J. L. Mahurin, Esq.

(57) ABSTRACT

An adjustable tensioner with a base, a pivot-arm that oscillates about a pivot secured to the base, a pulley attached to the pivot-arm, a compression spring with a first end operatively connected to the pivot-arm and a second end operatively connected to a shoe that presses a convex surface of the shoe against a concave arcuate surface of the pivot-arm, to the shoe held in place against a protuberance secured to the base by a balance of forces. An adjustment feature allows setting a base position with respect to an indicated predetermined belt spring force.

5 Claims, 3 Drawing Sheets

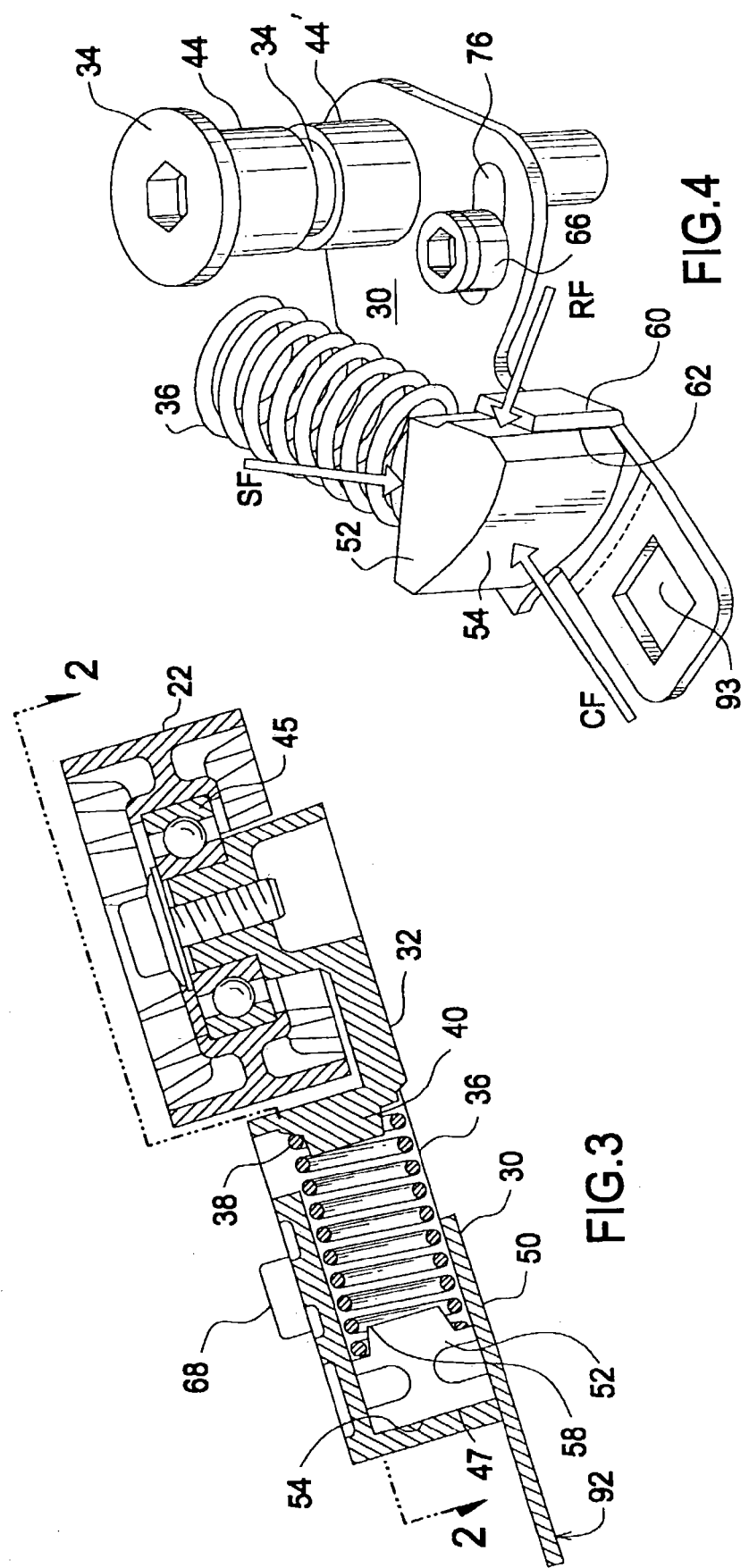

ADJUSTABLE TENSIONER

FIELD OF THE INVENTION

The invention relates to a tensioner, more particularly, to a tensioner having an adjustable base.

BACKGROUND OF THE INVENTION

Belt tensioners designed for synchronous drives cannot accommodate the movement necessary to properly remove slack from belt drives having long length belts.

Representative of the art is U.S. Pat. No. 5,938,552 to Serkh (1999) which discloses a tensioner with a base, a pivot-arm that oscillates about a pivot secured to the base, a pulley attached to the pivot-arm, a compression spring with a first end operatively connected to the pivot-arm and a second end operatively connected to a shoe that presses a convex surface of the shoe against a concave arcuate surface of the pivot-arm, to the shoe held in place against a protuberance secured to the base be a balance of forces.

Also representative of the art is U.S. Pat. No. 5,098,347 to Sajczvk (1992) which discloses a tensioner with a pulley rotatably mounted to a pivot arm that is biased with a spring. A wrenching means is described for applying a torque to the support structure.

What is needed is a tensioner having an adjustment feature for setting a base position with respect to an indicated predetermined belt spring force. The present invention meets this need.

SUMMARY OF THE INVENTION

The primary aspect of the invention is to provide a tensioner having an adjustment feature for setting a base position with respect to an indicated predetermined belt spring force.

Other aspects of the invention will be pointed out or made obvious by the following description of the invention and the accompanying drawings.

An adjustable tensioner having a base, a pivot-arm that oscillates about a pivot secured to the base, a pulley attached to the pivot-arm, a compression spring, with a first end operatively connected to the pivot-arm and a second end operatively connected to a shoe that presses a convex surface of the shoe against a concave arcuate surface of the pivot-arm, to the shoe held in place against a protuberance secured to the base by a balance of forces. An adjustment feature allows setting a base position with respect to an indicated predetermined belt spring force.

BRIEF DESCRIPTION OF THE DRAWINGS

The accompanying drawings, which are incorporated in and form a part of the specification, illustrate preferred embodiments of the present invention, and together with a description, serve to explain the principles of the invention.

FIG. 3 is a sectional view taken along the line 3—3 of FIG. 2.

FIG. 4 is a perspective view showing an interrelationship of certain features of the invention.

DETAILED DESCRIPTION OF THE PREFERRED EMBODIMENTS

Figure 1:
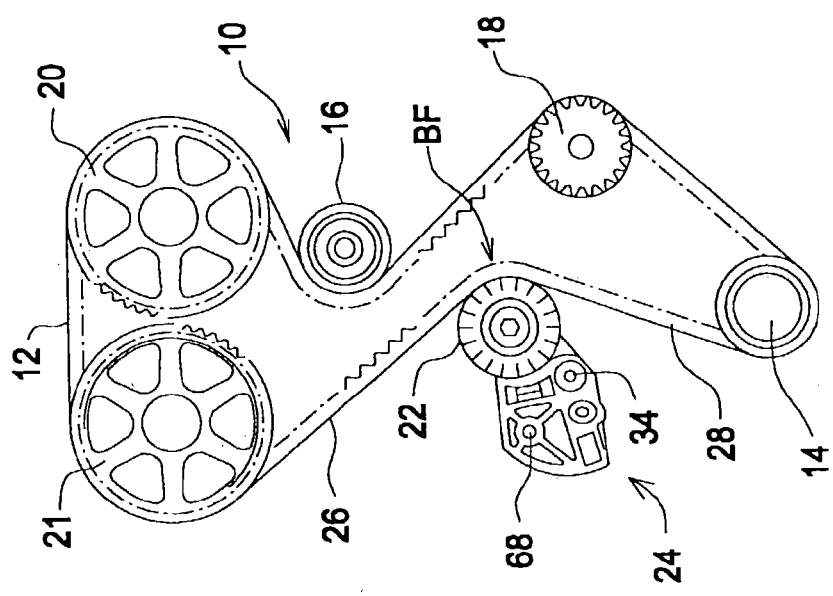
FIG. 1 is a front view schematic of a synchronous (timing) belt drive system of the automotive type which includes a tensioner of the invention.

Referring to FIG. 1 and for purpose of illustration without limitation to a particular belt drive system, a synchronous or "timing" belt drive system 10 includes a toothed belt 12 entrained and tensioned around a crank pulley 14, an idler pulley 16, and a water pump pulley 18, cam shaft pulleys 20, 21 and a tensioning pulley 22 of a tensioner 24 of the invention.

The tensioning pulley 22 engages the belt 12 and receives a belt load in the form of belt tension of adjacent belt spans 26, 28. The belt tension of the spans generate a belt force component BF which is referred to as the "hub load." The belt force component BF occurs along a bisector of an angle formed between the belt spans 26, 28.

Figure 2:
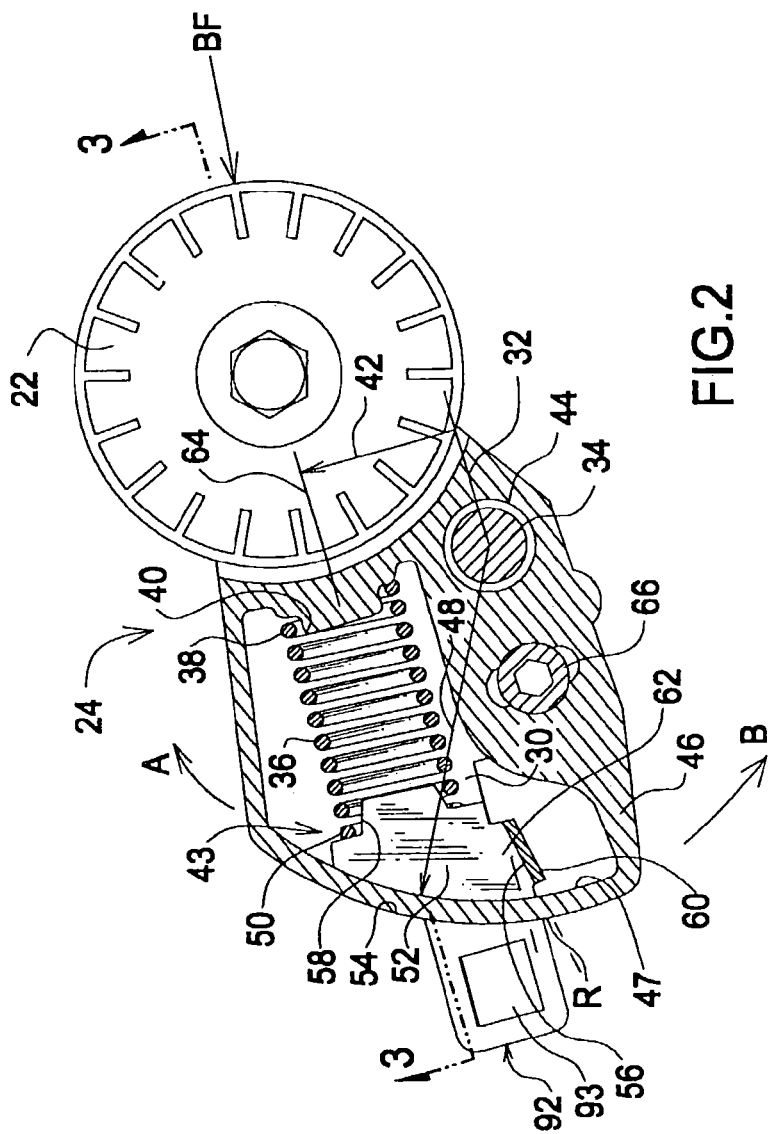
FIG. 2 is a sectional view taken along the line 2—2 of FIG. 3 and showing an enlarged tensioner of the invention.

Referring more particularly to FIGS. 2–4, the tensioner includes a base 30 and a pivot-arm 32 that oscillates about a pivot 34. Pivot 34 may be in the form of a fastener used to secure the tensioner to an engine (not shown). Pulley 22 is journaled to the pivot-arm and engages belt 12 and receiving the belt force BF. Compression spring 36 has a first end 38 operatively connected to the pivot-arm 32 such as by a boss 40 located at an operative radius 42 in relation to the pivot. A damping mechanism 43 is also included. Bushings 44, 44' are interpositioned between the pivot and pivot-arm in known fashion. The pulley is attached to the pivot-arm by way of a ball bearing 45, also in known fashion. Base 30 further comprises a tool receiving portion 92 which is described in FIGS. 5–6.

The pivot-arm 32 includes an extension 46 or portion in the form of a concave, arcuate surface 47 that moves with the pivot-arm and is spaced a radial distance 48 from the pivot 34. The concave arcuate surface 47 is oriented to generally face the pivot 34 and a second end 50 of the compression spring 36.

Arcuate surface 47, being substantially concentric with the pivot and optionally, has a radial distance 48 that is equal to or greater than the operative radius 42 for greater damping. Put another way, the larger the radius 48, the larger a resultant damping torque for a given damping force.

Damping mechanism 43 includes a moveable shoe 52 with a convex arcuate friction surface 54 that is complimentary to and engages concave arcuate surface 47 of pivot-arm portion 46. The shoe may be in two-part form with a pad of friction material engaged with surface 47 and attached to and backed up by the shoe. Shoe 52 has a ramp surface 56, and a spring receiving portion such as a boss 58. The spring receiving portion faces and attaches the second end 50 of the compression spring. The ramp surface 56 engages a protuberance 60 which is secured to or part of the base. Protuberance 60 has a complimentary ramp surface 62 that engages the ramp surface 56 of the shoe. The ramp surface of the protuberance is oriented at a divergent angle R in relation to a longitudinal axis 64 of the spring.

The compression spring 36 being biased between the pivot-arm and shoe, operates to press the convex surface 54 of the shoe against the concave surface 47 of the pivot-arm 32 to effect damping. The damping coefficient is a function of the spring rate of the spring 36. The greater the spring rate the greater the damping coefficient.

Referring more particularly to FIG. 4, the forces on the shoe 52 are balanced in such a manner to keep the shoe pressed against the ramp surface 62 when the arcuate surface oscillates in movement between a clockwise direction A and counterclockwise direction B. The ramp surface also operates to hold the second end of the spring in a substantially fixed position relative to the base by way of the boss 58.

Compression spring 36 exerts a spring force SF on the shoe pressing the convex arcuate surface 54 against the concave arcuate surface 47 wedging the ramps surface 56 of the shoe against the ramp surface 62, of the protuberance 60. The concave surface 47 exerts a reactionary force CF against the shoe and the ramp surface 62 exerts a reactionary force RF against the shoe. The summation of these forces operate to position the shoe against the ramp surface 62 which is secured to or formed of the base by way of the protuberance 60.

Figure 6:
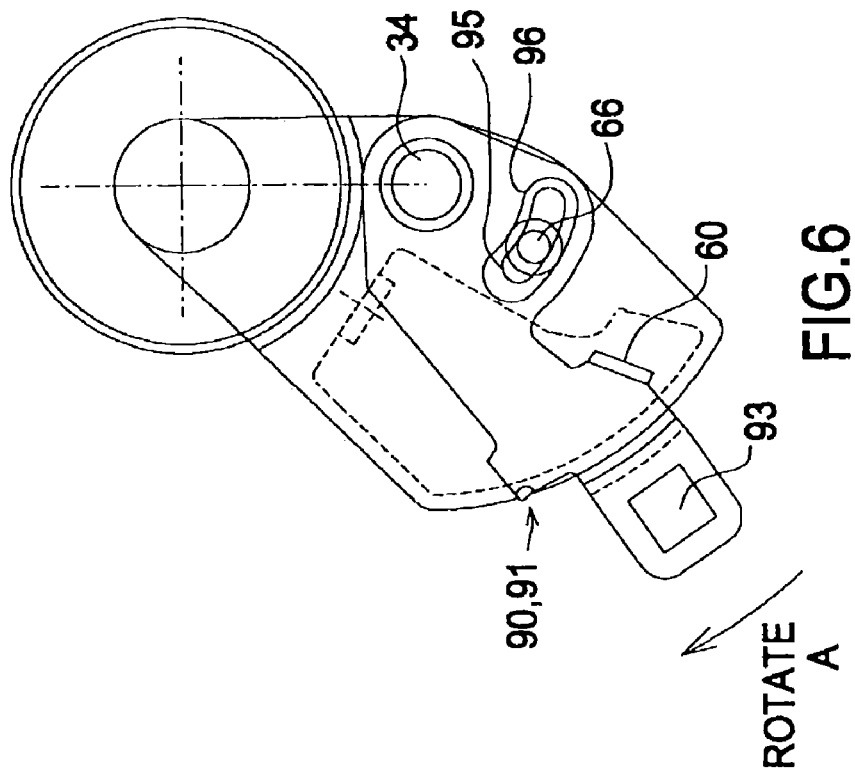
FIG. 6 is a plan view of the tensioner showing the adjustment feature.
Figure 5:
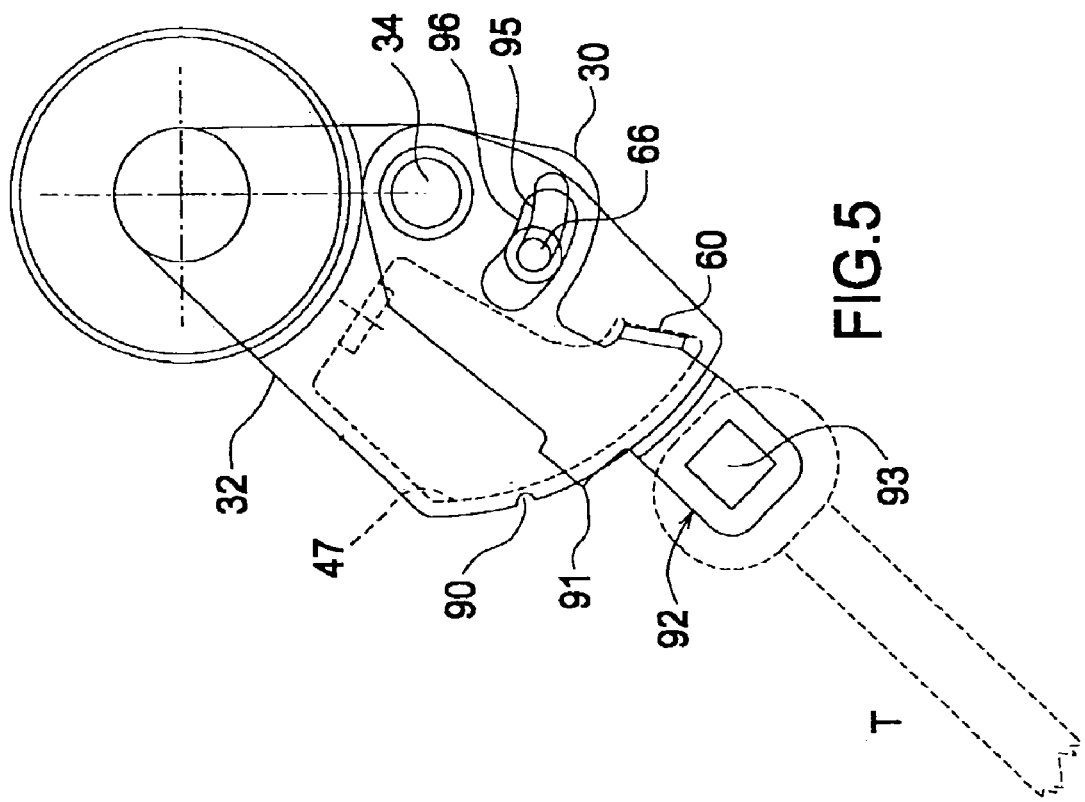
FIG. 5 is a plan view of the tensioner showing the adjustment feature.

For use, tensioner 24 is located adjacent its installed position to an automotive engine. Fasteners such as the pivot bolt 34 and another pin or bolt 66, attach and locate the tensioner in a fixed position on an engine (not shown). Toothed belt 12 is then entrained around the crank pulley 14, idler pulley 16, water pump pulley 18, and cam pulleys 20, 21. A wrenching surface 68 is provided as a means to rotate the tensioner with a wrench (in this case counterclockwise B) to a position away from the belt for easy belt installation. With the belt in the correct position, the pivot-arm is rotated (clockwise A) to where the pulley presses the belt to its belt engaging position as shown in FIG. 1. Toothed belt 12 is tensioned as the pulley is positioned in pressing engagement against the belt. The base 30, which may be in the form of a second pivot-arm that moves around the pivot 34, is then held in a fixed position relative to the engine by the fasteners 34, 66. FIGS. 5–6 describe the adjustment feature for adjusting a spring force.

The pulley is pressed into engagement with the belt by means of the compression spring pushing on the pivot-arm at its operative radius 42 so as to rotate the pivot-arm which in this case is clockwise A. The compression spring also presses against the moveable shoe 52 which is held in position relative to the base 30 by means of the engaged ramp surfaces 56, 62. Spring 36 presses the convex arcuate surface 54 of the shoe against the concave arcuate surface 47 of the pivot-arm. The concave arcuate surface 47 angularly oscillates A-B in response to angular movements of the pivot-arm 32. The shoe 52 operates to damp angular movements of the pivot-arm by friction surface sliding between the concave arcuate surface 47 of the pivot-arm and convex arcuate surface 54 of the shoe. The balance of forces from engaged ramp surfaces 56, 62, engaged arcuate surface, and spring operate to keep the second end 50 of the spring in substantially a fixed position in relation to the base 30 so that the spring can operate to bias the pivot-arm and press the pulley against the belt.

Should the tension in the belt spans 26, 28, momentarily increase from an engine operating condition, the belt will press against the pulley with an increased force BF that operates to rotate the pivot-arm counterclockwise B and further compress the compression spring 36 resulting in an increased spring force SF. The increase in spring force operates to press against the damping shoe with increased force against the shoe and thereby increases friction surface sliding between the concave and convex arcuate surface 47, 54 which operate to inhibit the pivot-arm from moving in the counterclockwise direction B. Once the tension in the span decreases and the belt force BF decreases, the pulley is quickly pressed against the belt span by means of the compression spring 36 so as to maintain a belt tension.

FIG. 5 is a plan view of the tensioner showing the adjustment feature. The adjustment feature shown in FIGS. 5–6 allows the tensioner to be installed to a predetermined spring force SF.

Referring to all Figs., tool receiving portion 92 radially extends, from base 30 with respect to pivot 34. Tool receiving portion comprises a hole 93 for receiving a known tool (T), such as a ⅜" or ½" ratchet for example. The-tool receiving portion 92 radially extends beyond the damping mechanism 43 with respect to the pivot rendering portion 92 easily-accessible for use.

Base 30 includes an indicator portion 91. Pivot arm 32 has an indicating portion 90 disposed to cooperate with indicator portion 91 to indicate a relative state of spring load. FIG. 5 shows the tensioner with spring 36 (not shown) in a fully extended or decompressed position. Protuberance 60 is engaged with pivot-arm 32 by action of spring 36. One can see that indicator portion 91 and indicator portion 90 are not aligned in this pre-installation configuration.

FIG. 6 is a plan view of the tensioner showing the adjustment feature. To install, tensioner 24 is located adjacent its installed position to an automotive engine and fasteners such as the pivot bolt 34 and another pin or bolt 66, attach and locate the tensioner in a fixed position on an engine (not shown). The toothed belt 12 is entrained around the crank pulley 14, idler pulley 16, water pump pulley 18, and cam pulleys 20, 21 as shown in FIG. 1. Pivot 34 and bolt 66 are loosely engaged with a mounting surface, but are not fully torqued.

A tool (T) is inserted into portion 92. With the belt in the correct position as described, the base 30 and pivot arm are rotated (clockwise A) until the pulley presses the belt to its belt engaging position as shown in FIG. 1. Slot 96 allows oscillation of pivot arm 32 about bolt 66. Using tool (T) base 30 is then rotated further about pivot 34 until indicator 91 aligns with notch 90. Slot 95 allows base 30 to rotate about pivot 34. Rotation of base 30 with respect to pivot arm 32 about pivot 34 compresses spring 36. An alignment of 90 and 91 indicate a proper spring force SF and hence belt tension has been achieved. The spring load or force SF is a function of the spring rate for spring 36 and the amount of spring compression necessary to align 90 and 91. The spring rate for spring 36 can be selected as required to accommodate a desired operating condition. Pivot 34 and bolt 66 are torqued into place. Pivot arm 32 pivots about pivot 34 during operation. Bolt 66 in conjunction with pivot 34 immovably attaches base 30 to the mounting surface. Tool (T) is then removed.

The foregoing description is made for purpose of illustration only and is not intended to limit the scope of the invention which is to be determined by the appended claims. Further, although a form of the invention has been described herein, it will be obvious to those skilled in the art that variations may be made in the construction and relation of parts without departing from the spirit and scope of the invention described herein.

I claim:

1. An adjustable tensioner comprising:
   a base;
   a pivot-arm that oscillates about a pivot secured to the base;
   a pulley attached to the pivot-arm and for engaging the belt;

a compression spring with a first and operatively connected to the pivot-arm at an operative radius in relation to the pivot;

and a damping mechanism that inhibits oscillatory movements of the pivot-arm;

the pivot-arm comprising a concave arcuate surface that moves with the pivot-arm and is spaced a distance from the pivot, the concave arcuate surface oriented to generally face the pivot and a second end of the compression spring;

the damping mechanism comprising a moveable shoe with a convex arcuate friction surface complimentary to and engaging the concave arcuate surface of the pivot-arm, a spring receiving portion that faces and attaches to a second end of the spring, and a surface portion that engages a protuberance secured to the base, the spring applying a spring force against the shoe pressing the convex arcuate surface against the concave surface generating a reactionary force to the shoe, the spring force and reactionary force combining to press the shoe against the protuberance, the improvement comprising;

an adjustment portion extending from the base comprising a tool receiving portion;

an indicator portion on the pivot-arm;

an indicator portion disposed on the base to cooperate with the indicator portion on the pivot-arm for indicating a predetermined compression spring force.

2. The tensioner as claimed in claim 1 wherein the surface portion of the damping shoe and the protuberance are in the form of complimentary ramp surfaces oriented in the direction of a divergent angle in relation to a longitudinal axis of the compression spring.

3. The tensioner as claimed in claim 1 where the concave arcuate surface of the, pivot-arm is substantially concentric with the pivot.

4. The tensioner as in claim 1 wherein the tool receiving portion further describes a hole.

5. The tensioner as in claim 1 wherein the tool receiving portion radially extends beyond the damping mechanism with respect to the pivot.

* * * * *